US006692259B2

(12) United States Patent
Kumar et al.

(10) Patent No.: US 6,692,259 B2
(45) Date of Patent: Feb. 17, 2004

(54) METHOD AND APPARATUS FOR PROVIDING INTERACTIVE KARAOKE ENTERTAINMENT

(75) Inventors: David Kumar, Sunnyvale, CA (US); Subutai Ahmad, Palo Alto, CA (US)

(73) Assignee: Electric Planet, Palo Alto ( * ) Notice: Subject to any disclaimer, the term of this patent is extended or adjusted under 35 U.S.C. 154(b) by 0 days.

(21) Appl. No.: 10/317,510

(22) Filed: Dec. 11, 2002

(65) Prior Publication Data

US 2003/0124499 A1 Jul. 3, 2003

Related U.S. Application Data

(62) Division of application No. 09/226,380, filed on Jan. 6, 1999, now Pat. No. 6,514,083.
(60) Provisional application No. 60/070,626, filed on Jan. 7, 1998.

(51) Int. Cl.[7] .................................................. G09B 5/00
(52) U.S. Cl. ............................. 434/307 A; 434/307 R; 84/610; 84/477 R; 345/863; 345/630; 386/54; 386/102
(58) Field of Search ..................... 434/118, 307 R–318, 434/365; 84/477 R, 601–615, 645, 675; 386/46, 54, 96, 97, 102, 104, 106, 107, 348; 463/1; 345/630, 863; 382/103, 294; 348/722; 360/18, 22, 131–136; 369/30, 48, 178, 192

(56) References Cited

U.S. PATENT DOCUMENTS

| | | | | | |
|---|---|---|---|---|---|
| 5,099,337 | A | * | 3/1992 | Cury | 386/54 |
| 5,144,454 | A | | 9/1992 | Cury | |
| 5,151,793 | A | | 9/1992 | Ito et al. | |
| 5,689,081 | A | | 11/1997 | Tsurumi | |
| 5,691,494 | A | | 11/1997 | Sai et al. | |
| 5,725,383 | A | | 3/1998 | Funahashi et al. | |
| 5,803,747 | A | | 9/1998 | Sone et al. | |
| 5,810,603 | A | | 9/1998 | Kato et al. | |
| 5,827,990 | A | | 10/1998 | Fujita | |
| 5,913,259 | A | * | 6/1999 | Grubb et al. | 84/610 |
| 6,072,494 | A | * | 6/2000 | Nguyen | 345/863 |
| 6,072,933 | A | * | 6/2000 | Green | 386/46 |
| 6,130,677 | A | * | 10/2000 | Kunz | 345/630 |
| 6,160,899 | A | * | 12/2000 | Lee et al. | 382/103 |
| 6,267,600 | B1 | * | 7/2001 | Song | 434/307 A |
| 6,411,744 | B1 | * | 6/2002 | Edwards | 382/294 |
| 2001/0034255 | A1 | * | 10/2001 | Hayama et al. | 463/1 |

FOREIGN PATENT DOCUMENTS

| | | | | |
|---|---|---|---|---|
| JP | 9-275524 | A | * | 10/1997 |
| JP | 2000-29483 | A | * | 1/2000 |

OTHER PUBLICATIONS

"Virtual Stage: A Scenario–based Karaoke System iln A Virtual Environment" by Lee et al, IEEE Xplore, Oct. 1997, pp. 159–167.*

"Virtual Stage: A Location–based Karaoke System" by Sul et al, IEEE Multimedia, vol. 5, Iss. 2, Apr.–Jun. 1998, pp. 42–52.*

* cited by examiner

*Primary Examiner*—Joe H. Cheng
(74) *Attorney, Agent, or Firm*—Van Pelt & Yi LLP

(57) ABSTRACT

An interactive karaoke system includes a microphone developing an audio input from at least one karaoke performer; a camera producing a series of video frames including the at least one karaoke performer; and a karaoke processor system including a video environment and a related audio environment for the karaoke performer. The karaoke processor system is coupled to the camera to create extracted images of the at least one karaoke performer from the series of video frames and to composite the extracted images with a background derived from the video environment. The video environment is affected by at least one of a position and a movement of the at least one karaoke performer. A karaoke network includes a local area network, a local karaoke server coupled to the local area network and storing local karaoke content; and a number of karaoke systems coupled to the local area network, each of which can request karaoke content from the local karaoke server.

11 Claims, 14 Drawing Sheets

METHOD AND APPARATUS FOR PROVIDING INTERACTIVE KARAOKE ENTERTAINMENT

CROSS REFERENCE TO RELATED APPLICATIONS

The present application is a divisional application of U.S. patent application Ser. No. 09/226,380, filed Jan. 6, 1999, now U.S. Pat. No. 6,514,083 B1, which is a continuation application of Provisional U.S. Application Serial No. 60/070,626, filed Jan. 7, 1998, all of which are incorporated herein by reference, and is related to U.S. patent application Ser. No. 08/951,089 (filed Oct. 15, 1997), now U.S. Pat. No. 6,532,022 B1; U.S. patent application Ser. No. 08/951,070 (filed Oct. 15, 1997), now U.S. Pat. No. 6,072,494; U.S. patent application Ser. No. 09/174,491 (filed Oct. 15, 1998), now U.S. Pat. No. 6,411,744 B1; U.S. patent application Ser. No. 08/951,087 (filed Oct. 15, 1997)), now U.S. Pat. No. 6,101,289; U.S. patent application Ser. No. 08/943,681 (filed Oct. 15, 1997)), now U.S. Pat. No. 6,130,677; U.S. patent application Ser. No. 09/173,583 (filed Oct. 15, 1998)), now U.S. Pat. No. 6,384,819 B1; U.S. patent application Ser. No. 08/950,404 (filed Oct. 15, 1997)), now U.S. Pat. No. 6,031,934; and U.S. patent application Ser. No. 08/951,083 (filed Oct. 15, 1997)), now U.S. Pat. No. 6,118,459; all assigned to the assignee of the present application, all of which are incorporated herein by reference.

BACKGROUND OF THE INVENTION

This invention relates generally to multimedia entertainment systems, and more particularly to karaoke systems.

Karaoke is a form of entertainment, originating in Japan, that features a live singer with pre-recorded accompaniment. Karaoke is a Japanese abbreviated compound word, where "kara" comes from "karappo" meaning empty, and "oke" is the abbreviation of "okesutura," or orchestra. Therefore, karaoke literally means "empty orchestra." While originating in Japan, the karaoke boom has spread abroad, and is popular in Korea, China and other parts of Southeast Asia, as well as in the U.S. and Europe.

Karaoke music was originally recorded on audio tape, but quickly evolved with the advent of the compact disk, which not only allows rapid, non-serial access new songs, but which also can include multimedia effects such as video and lyrics. Therefore, the advent of the compact disk made it possible to enhance the karaoke experience with video scenes synchronized with the music and the accompanying lyrics.

Using technological innovations such as the video disk, laser disk, and CD graphics, karaoke has grown to be a major entertainment industry. Family-use karaoke sets are also available. However, there is an obstacle to this end of the business: since most Japanese houses stand close each other and are still built of wood, with poor soundproofing, it would be very annoying of the neighbors to sing into an amplified karaoke system at night.

Reacting to the opportunity created by this problem, entrepreneurs created the "karaoke box", a roadside facility containing closed-door insulated rooms for singing. They are advertised as a place where you can "sing to your heart's content." The first karaoke box appeared in 1984 in a rice field in the countryside of Okayama Prefecture, just west of the Kansai area. It was built from a converted freight car. Since then, karaoke boxes have been built on unoccupied grounds all over Japan, and in urban areas, karaoke rooms, which consist of compartments made by partitioning and soundproofing rooms in a building, were introduced and set up one after another.

Karaoke is a common form of entertainment for Japanese business people. It is not at all uncommon for workers to drop into a bar with colleagues after work, have a drink, and enjoy singing popular songs to the accompaniment of karaoke. Karaoke has been entertaining people ever since its invention 20 years ago, and has become firmly established in Japanese society.

Today, karaoke is available in a wide variety of formats, suitable for any venue, from a soloist rehearsing up to large crowds at community gatherings. However, a typical karaoke show includes one or two singers, and a possibly a karaoke operator to operate the karaoke equipment. Couples will often enjoy a karaoke session together. The equipment typically includes a player, an amplifier, and a television monitor for the music video. There may be an additional television monitor facing the singers to display the lyrics, or the lyrics can be displayed on the television monitory that is displaying the music video.

While karaoke is very popular, it may be reaching a saturation point, at least in Japan. This is because there are many thousands of karaoke boxes and bars having karaoke systems and, as such, the novelty is beginning to wear off.

One attempt to increase the interest in karaoke is the use of "blue screen" technology which allows a video camera to capture the image of one or more persons standing in front of a blue screen, and inserting the images of those persons into the music video. However, this technology is somewhat cumbersome in that it requires a specialized stage including the blue screen, and in that the karaoke customers are merely superimposed upon a background image of the music video without any interactivity with that background scene.

What would therefore be desirable is a karaoke system which allows new, enhanced, and interactive participation of karaoke customers with their karaoke experience.

SUMMARY OF THE INVENTION

In one embodiment of the interactive karaoke system of the present invention, a personal computer (PC) is paired with a karaoke audio/video system and a video camera to provide interactivity between the karaoke customers (i.e. the karaoke performers) and the karaoke system. In one aspect of the present invention, images of the karaoke customers are captured with a video camera, processed in the personal computer, and composited into the musical video presentation. However, unlike prior art "blue screen" technologies, no special blue screen is required, and the user can interact with the karaoke content as portrayed on the TV monitor. For example, the karaoke customer may make gestures which to cause the images on the TV monitor to change.

A process for providing interactive karaoke entertainment includes the acts of determining if there is a user initiation and, if so, whether the request of content is local. If not, the content is retrieved. Next, a "frame" of video information is received by the video camera, and background subtraction is performed. Then, there is a tracking analysis, with the results being put into a tracking buffer. A gesture analysis is then performed. Next, the image is "composited" based upon the tracking and gesture analysis and the request of content. The resulting multimedia content is then outputted and, preferably, recorded. The next frame is then retrieved from the video camera and the process is repeated.

The interactive karaoke entertainment system is designed so that it can form a part of a larger network of karaoke entertainment systems. More particularly, a number of interactive karaoke entertainment systems are adapted to coupled to a local area network (LAN) which is served by a local PC server. The local PC server can communicate with an Internet based content server to download content that is not locally available and to upload accounting information.

The local PC server includes the acts of determining whether it has been polled by a content server and, if so, accounting information is transferred to the contents server and other information or software or content can be uploaded or downloaded with the content server. If there has been no polling, the local PC server then determines whether there is a request from a local PC that is coupled to the local area network. If there is, it is determined whether the content is locally available and, if not, the local PC server communicates with remote content server to obtain the desired content. The content is then downloaded to the requesting PC over the local area network and an accounting entry is created at the local PC server reflecting the karaoke customers use of that content.

It will therefore be appreciated that the interactive karaoke system of the present invention will add a new dimension of enjoyment to the karaoke experience. The interactive nature allows the karaoke to transcend a simple performance and take on aspects of an interactive game. This increases the enjoyment and therefore the use of the interactive karaoke systems of the present invention.

These and other advantages of the present invention will become apparent upon reading the following detailed descriptions and studying the various figures of the drawings.

DETAILED DESCRIPTION OF THE PREFERRED EMBODIMENTS

Figure 1:
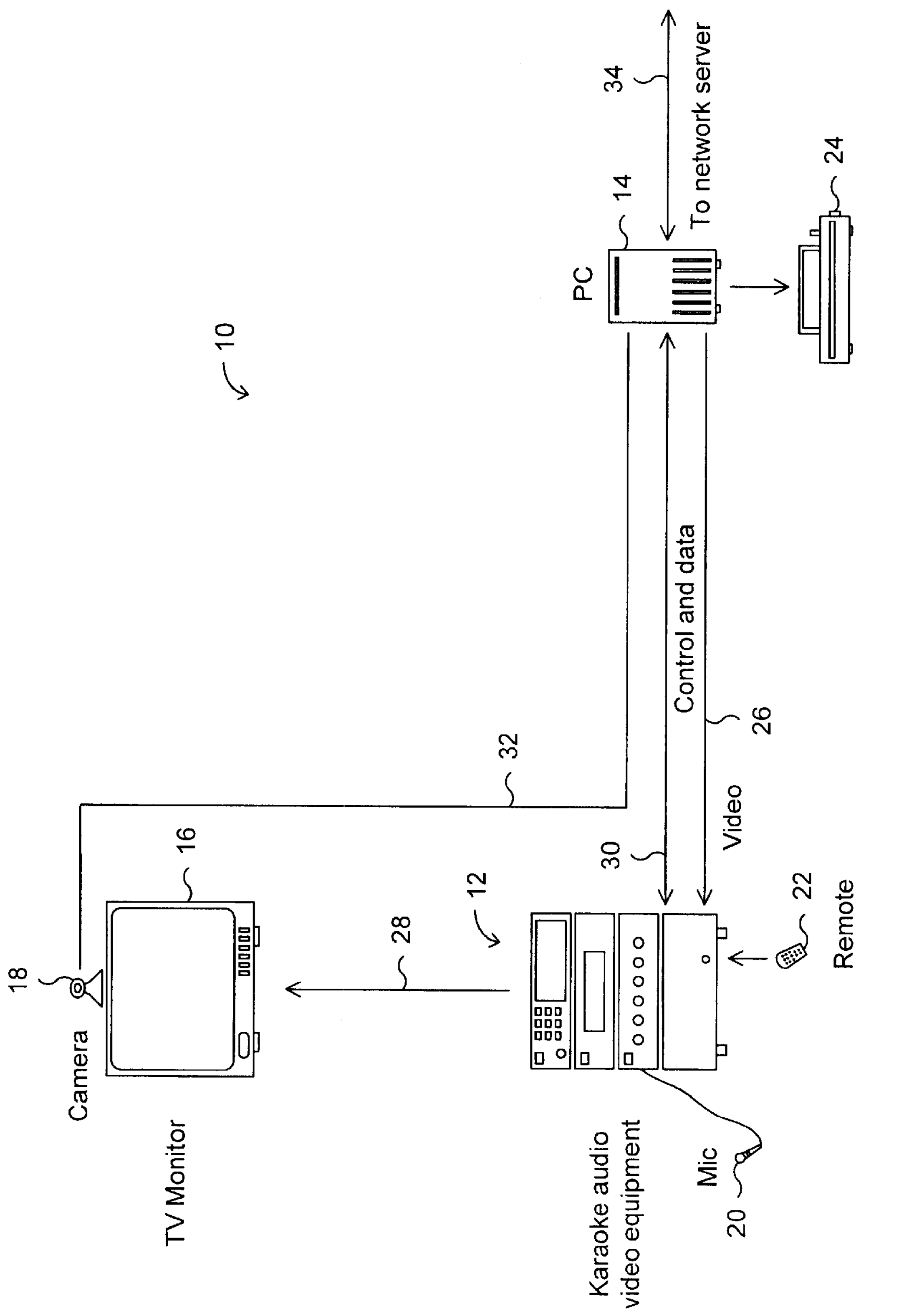
FIG. 1 is a representation of interactive karaoke entertainment system in accordance with the present invention.

In FIG. 1, an interactive karaoke entertainment system 10 in accordance with the present invention includes karaoke audio and video equipment 12, a personal computer (PC) 14, a TV monitor 16, and a video camera 18. Associated with the karaoke audio and video equipment 12 is an input microphone 20 and a remote control 22. An optional photo-printer 24 can be coupled to the PC 12.

The karaoke audio and video equipment can be provided by any number of vendors. In this embodiment of the entertainment system 10, only the audio portion of the karaoke equipment 12 is used. In other words, as a karaoke customer sings into the microphone 20, the karaoke equipment 12 will amplify and process the sound and play it from speakers (not shown) and/or the TV monitor 16. However, the image for the TV monitor 16, in the present embodiment, is provided by the PC 14 via a video input line 26 to the karaoke equipment 12. Karaoke equipment, such as karaoke equipment 12, typically have an external video input to receive external video information. The combined video and audio is then provided by the karaoke equipment 12 to the TV monitor 16 as illustrated by arrow 28.

In addition, the karaoke equipment 12 typically includes a control and data port (often a serial port) which is coupled to the PC by a bus 30. The output of the video camera 18 is coupled to the PC 14 by a cable 32 and, in alternate embodiments of the invention, may be coupled to the PC by a control cable to allow specialized software and utilities to be loaded into the camera 18 from the PC 14. The photo-printer 24 allows the capture of images that are displayed on the TV monitor that can be printed as photographs, photographic buttons, rubber stamps, etc. There are several vendors for such photo-printers. Preferably, the PC 14 is coupled to a local network server by a local area network (LAN) cable 34.

Figure 2:
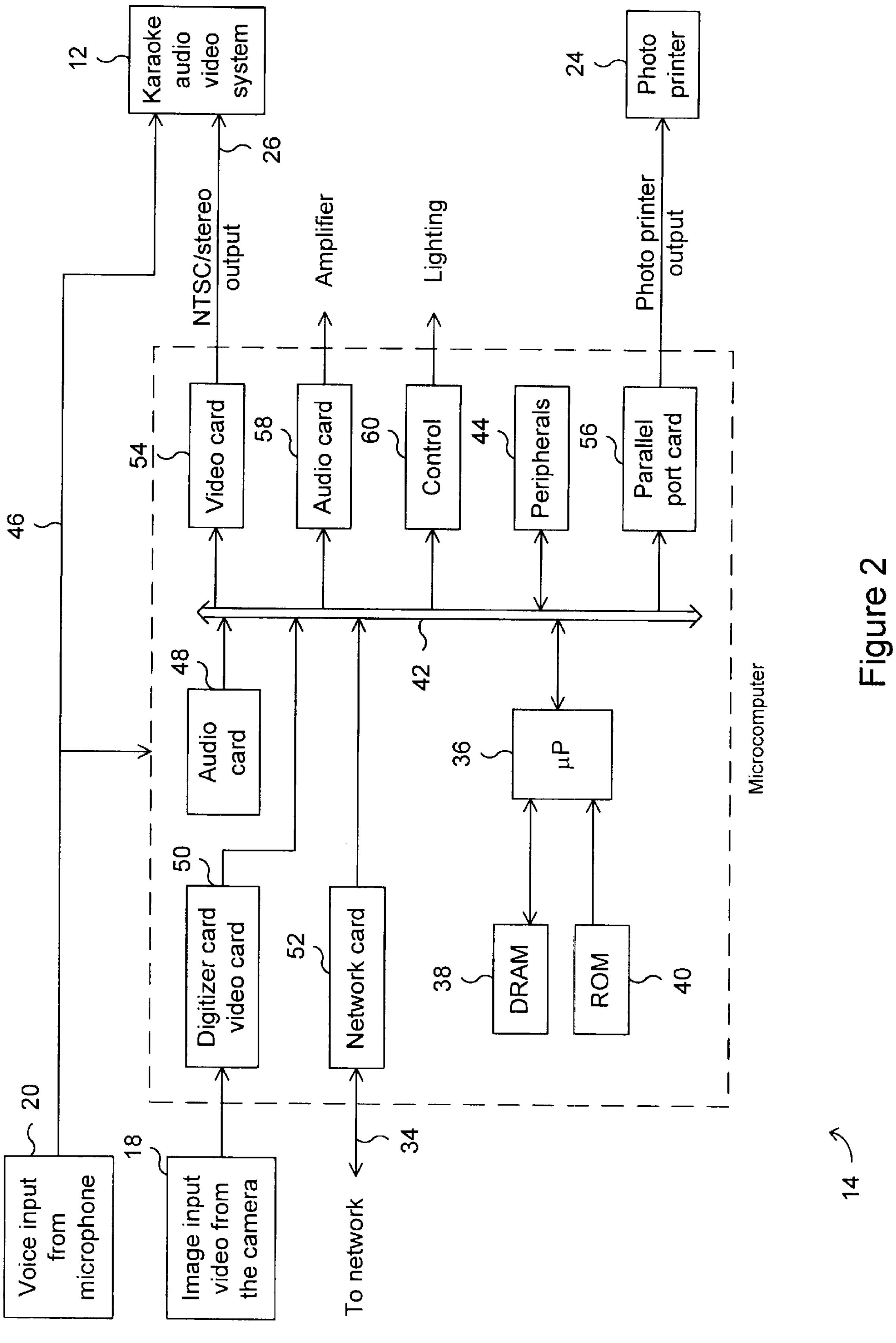
FIG. 2 is a block diagram of a portion of the system of FIG. 1.

In FIG. 2, the PC 14 and some peripheral components connected thereto are illustrated in block diagram form. The PC 14 is preferably a standard microcomputer available from a variety of sources including a microprocessor 36 that is coupled to dynamic random access memory (DRAM) 38 and to read only memory (ROM) 40. The microprocessor 36 is also coupled to one or more I/O buses 42 to which peripherals, such as peripheral 44 is coupled. For example, peripheral 44 can be a CD-ROM drive, a DVD drive, a hard disk drive, or any number of input/output (I/O) interfaces. The voice input from the microphone 20 is coupled to the karaoke audio video equipment 12 via a cable 46 and, optionally, to the I/O bus 42 by an audio input card 48. The image input from the video camera 18 is input to a video input card 50 which, also, is coupled to I/O bus 42. The LAN 34 is coupled to the I/O bus 42 by a network card 52. A video output card 54 is coupled to the I/O bus and produces NTSC (and possibly stereo) output for the karaoke audio visual system 12 on the line 26. A parallel card 56 is coupled to the I/O bus 42 and produces photo-printer output signals for the photo-printer 24. An audio card 58 produces an audio output for a power amplifier (not shown) that may be hooked up to loudspeakers (also not shown). A control card 60 an be provided for purposes such as lighting control.

Figure 3:
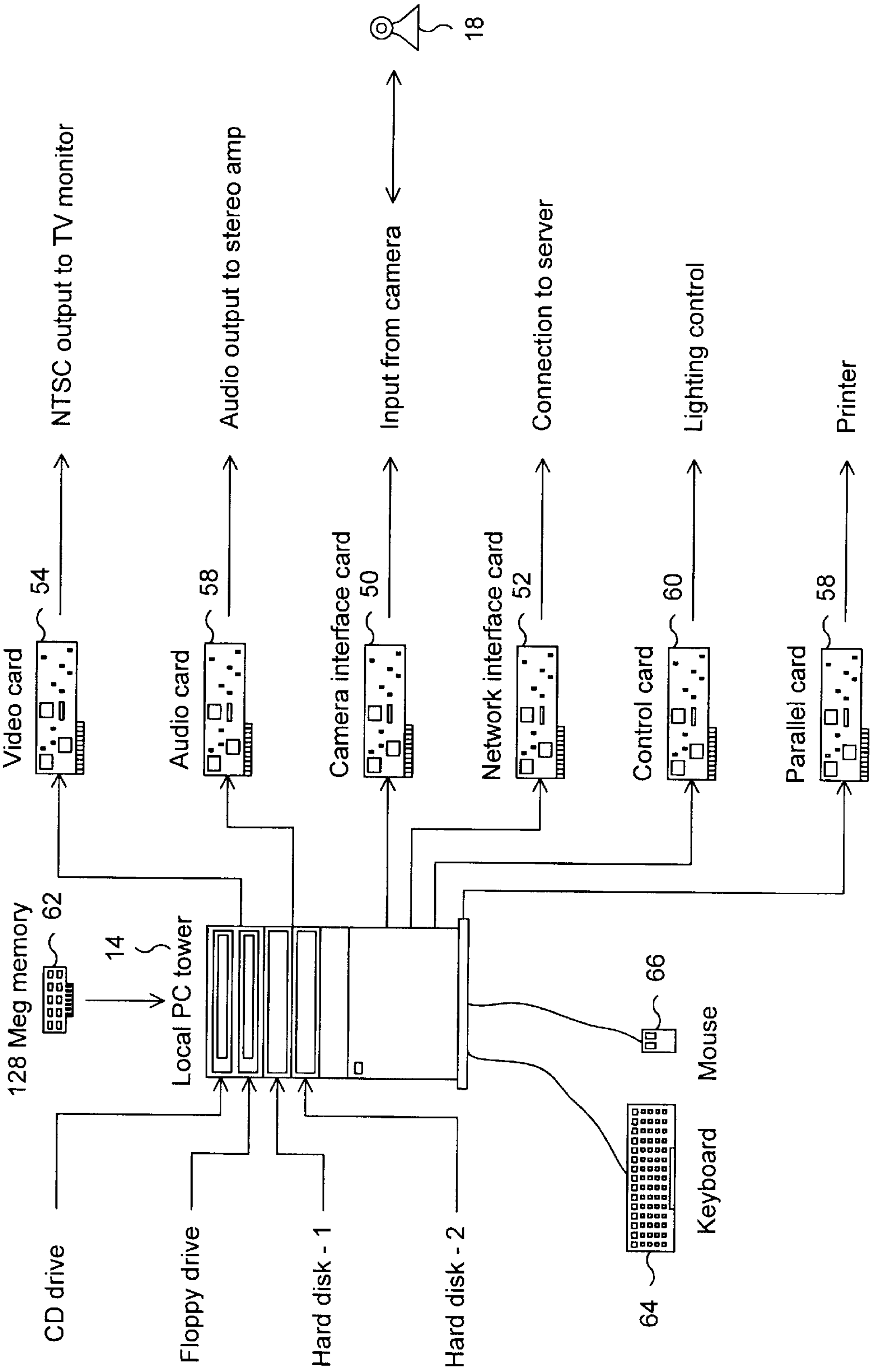
FIG. 3 is a pictorial representation of the personal computer (PC) portion of the system of FIG. 1.

In FIG. 3, a preferred physical implementation of the PC 14 as illustrated. In the present embodiment, the PC 14 is of a "tower" design which provides a multiplicity of I/O slots for he various cards of the present invention. More particularly, a memory expansion board 62, a video card 54, the audio card 58, the camera interface card 50, the network interface card 52, the control card 60, and the parallel card 58 are preferably plugged into I/O slots within the PC tower 14. A keyboard 64 and a mouse 66 are coupled to the PC tower 14 in a conventional manner. Likewise, the PC tower 14 is preferably provided with a CD-ROM drive, a floppy drive, and a pair of hard disks in a conventional fashion. It is preferred to have two hard disks operating in parallel (i.e. "mirroring" each other) for redundancy, since this is the most common area of failure in the PC. By having redundant hard disks drives, the karaoke operator can be virtually assured that the karaoke entertainment system will be continuously operable.

Figure 4:
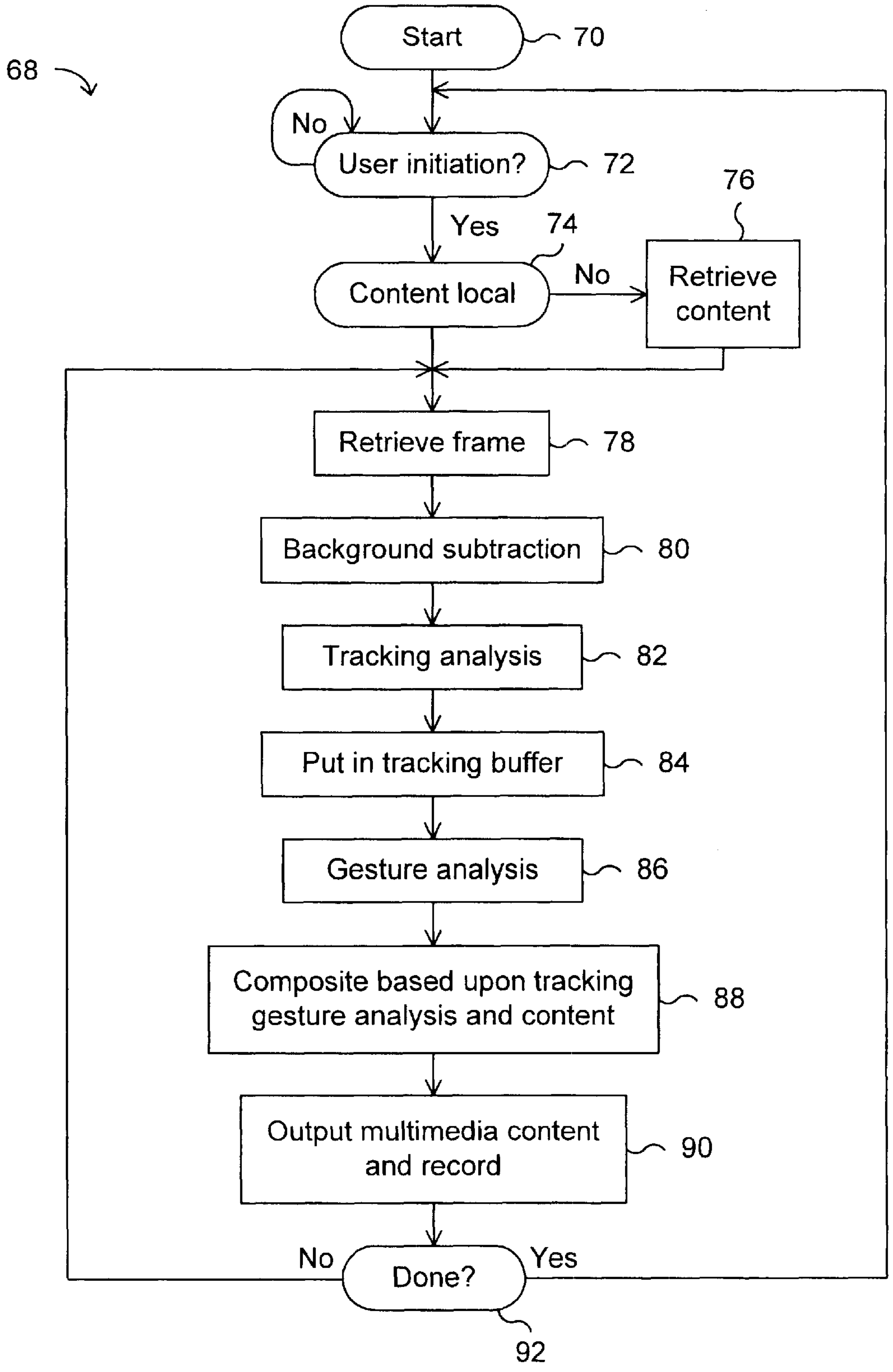
FIG. 4 is a flow diagram illustrating the computer implement operations performed by the personal computer of FIG. 3.

In FIG. 4, the computer implemented process running on the PC 14 is illustrated in flow-diagram. More particularly, the process 68 begins at 70 and, in a decision operation, it is determined whether a user (i.e. a "karaoke customer") is initiating the use of the karaoke entertainment system. This is typically accomplished by using the remote control 22 to activate the selection of a karaoke song. If there is no user initiation, the operation 72 cycles until an initiation is detected. Once an initiation is detected, the process 68 determines whether the requested content is local. By "content" it is meant the requested music video, along with any accompanying multi-media affects and software required for the interactivity with the karaoke entertainment system. If the content is not local, an operation 76 retrieves the content.

Next, in an operation 78, a "frame" of video data is retrieved from the video camera 18. Once the frame has been retrieved and buffered in the memory of the personal computer 14, a background subtraction is performed. A preferred process for background subtraction is described in co-pending application U.S. Ser. No. 08/951,089 which has been incorporated herein by reference. Next, a tracking analysis operation 82 is performed and the results are placed in a tracking buffer of the PC 14 and an operation 84. Preferred processes for tracking are described in one or more of the co-pending patent applications that have been incorporated by reference. Next, a gesture analysis operation 86 is performed. The preferred gesture analysis process as described in co-pending U.S. Ser. No. 08/951,070 which has been incorporated by reference. Subsequently, the images composited based upon the tracking and gesture analysis of operations 82 and 86, respectively, and by the content requested by the karaoke customer. Preferred methods for compositing are described in co-pending U.S. Ser. No. 08/951,089 which has been incorporated herein by reference. Finally, in operation 90 the resulting composited multi-media content is outputted and, preferably, recorded in a suitable recording device such as a video cassette recorder, recordable CD-ROM, recordable DVD disk, etc. It is the determined in operation 92 if the karaoke customer is done with their particular karaoke session. If so, process control is returned to operation 72 and if not, process control is returned to operation 78 to retrieve a new frame from the video camera.

Figure 4A:
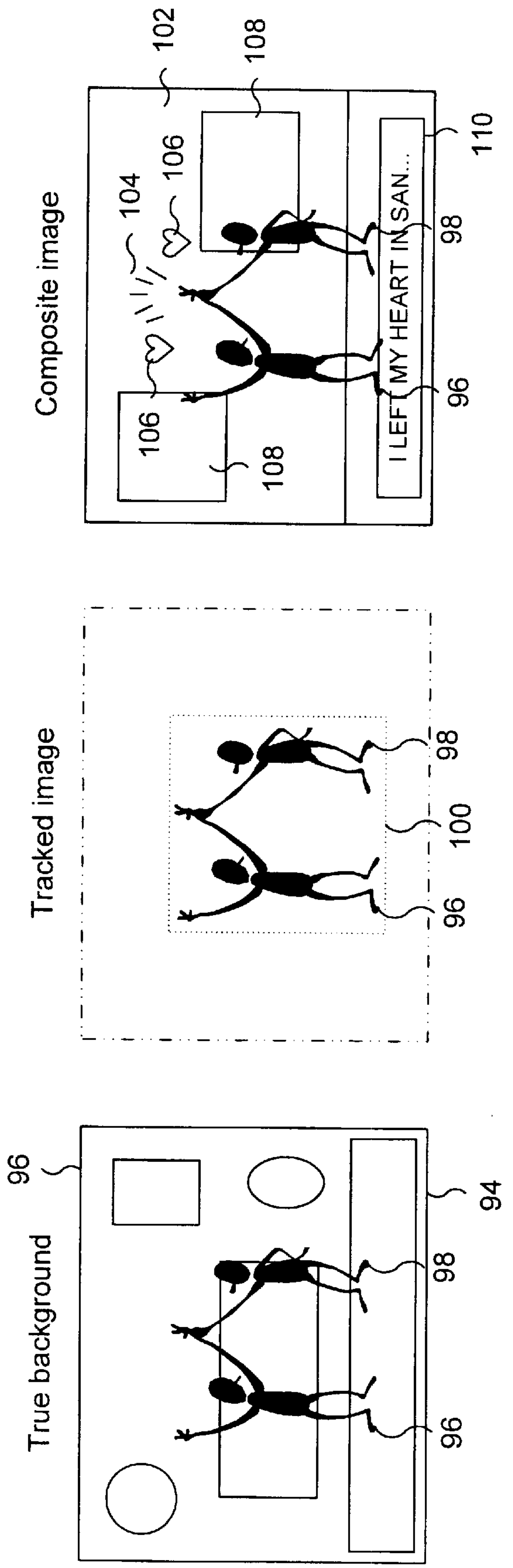
FIG. 4A is a illustration of the compositing act of FIG. 4.

In FIG. 4A, the operation of the process 68 is illustrated. More particularly, a "frame" 94 of video derived from the camera 18 is loaded into the memory 62 of the PC 14. Those skilled in the art of digital video are well acquainted with the concept of frames. The frame 94 includes the "true" background image 96 and the images of two karaoke customers or "players" or "performers" 96 and 98. The frame is retrieved by operation 78 and a background subtraction is performed by operation 80 to remove all but the karaoke customers 96 and 98. It should be noted that this background subtraction is accomplished without the use of the awkward blue screen apparatus of the prior art. With the background subtracted, the operation 82 performs the tracking analysis operation 82 to provide a tracked image 100. The compositing operation 88 then composites the karaoke customers 96 and 98 into an interactive environment 102.

The aforementioned technologies permit the karaoke customers 96 and 98 to interact with the environment 102. For example, when karaoke customer 96 raises her hands above her head, animated sparks 104 can be caused to fly from her fingertips. As another example, the grasping of the hand of the karaoke customer 96 by the karaoke customer 98 can be used a gesture which produces the images of hearts 106 in the interactive environment 102. Other gestures or body positions can also interact with various objects 108 in the interactive environment, or change the scene of the interactive environment. Therefore, with the technology of the present invention, karaoke becomes a truly interactive activity, somewhat akin to a game, wherein the multi-media, enhanced reality, and virtual reality effects are possible. It should also be noted that this is a true multi-media experience for the karaoke customers. In addition to video and audio outputs, there are the lyrics 110 of the song, animation effects, etc.

Figure 4B:
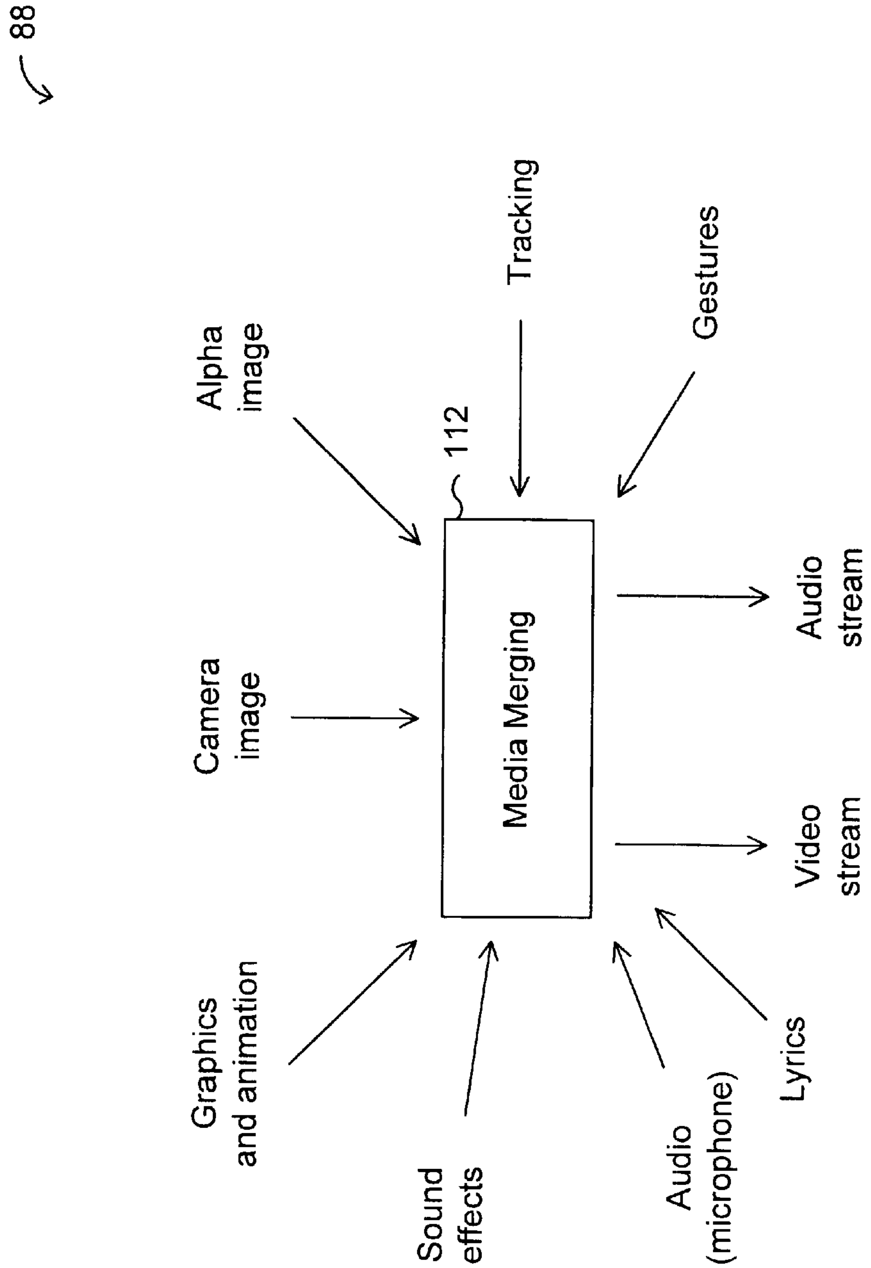
FIG. 4B is an illustration of the compositing act of FIG. 4.

In FIG. 4B, some of the activities of the compositing operation 88 are illustrated in a conceptual form. The operation 88 includes a "media merging" engine 112 which has input, lyrics, audio (e.g. such as from the microphone), sound effects, graphics, animation, camera images, alpha images (as disclosed in the aforementioned U.S. Ser. No. 08/951,089), tracking information, and gestures. The output is a video stream which provides the video signals for a television monitor, and an audio stream which provides the audio signals for the television monitor and/or separate loudspeakers.

Figure 5:
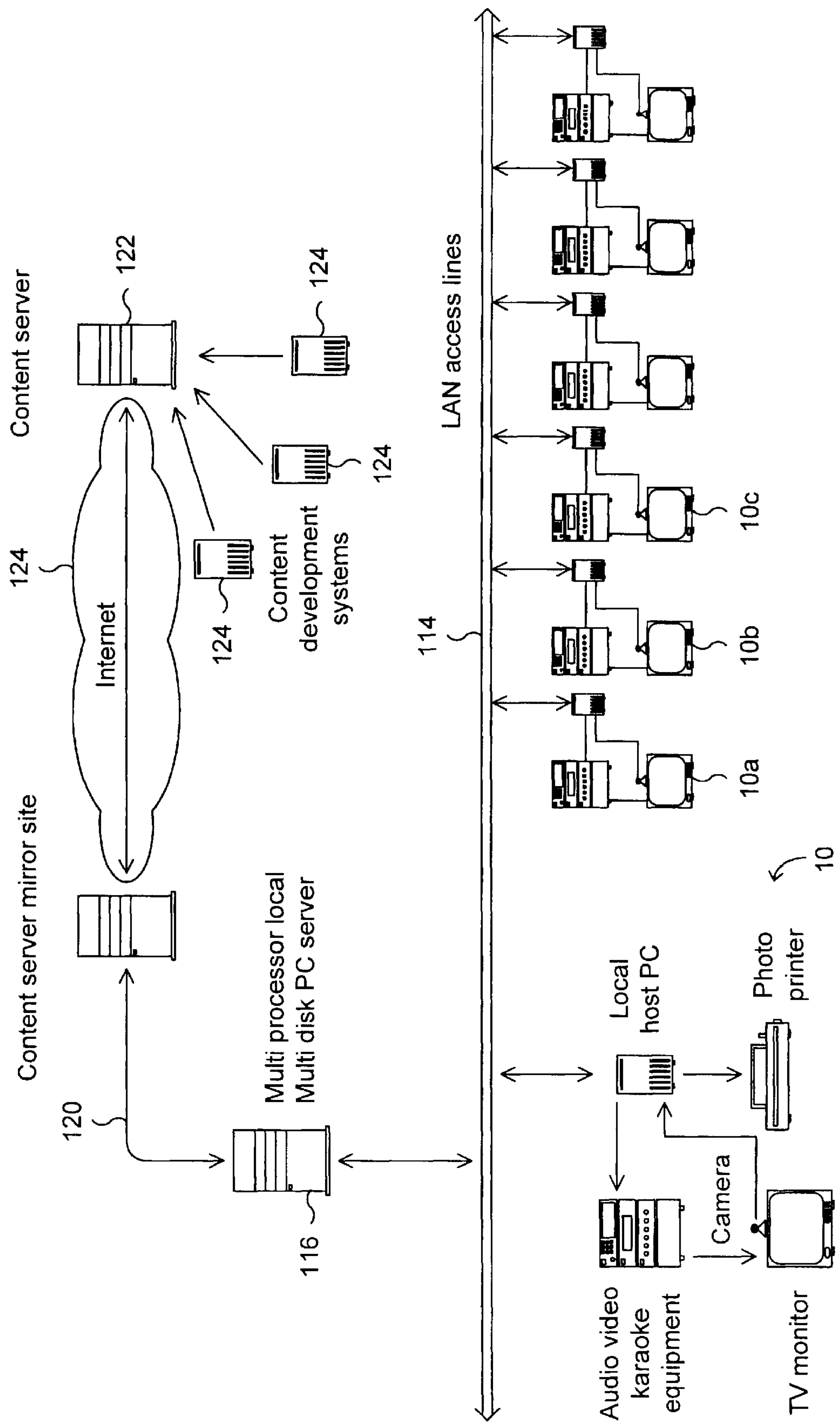
FIG. 5 is a representation of a networked karaoke entertainment system of the present invention.

In FIG. 5, a network configuration for the interactive karaoke entertainment system 10 is illustrated. More particularly, a karaoke entertainment system 10 is shown in the lower left hand corner of the page, while a number of other similar systems 10A, 10B, 10C, etc. are also illustrated. Each of the interactive karaoke entertainment systems 10 are coupled to a local area network (LAN) backbone or hub 114 to communicate with a local PC server 116. Preferably, the local PC server 116 is simply a powerful personal computer system.

Also preferably, the local PC server 116 and the interactive karaoke entertainment systems are in fairly close proximity, e.g. within the same building. For example, each of the interactive karaoke entertainment systems 10 can be located in its own, soundproofed room, while the local PC server can be provided in a server or operator room in the same building. The implementation of local area networks are well known to skilled in the art. Preferably, the local PC server is coupled to a content server 118 by a telephone line 120. The content server 118 includes karaoke "content", which is defined as musical video accompanied by lyrics and any data or software programs required for the interactive use of the "content." The telephone line connecting the local PC server to the content server can be a standard analog telephone line (with the use of appropriate modems at both the local PC 16 and the content server 118), or can be a digital line such as an ISDN line, T1 line, etc. digital line. The advantage of the digital lines are, of course, a significantly higher data transfer rate, with the disadvantage of higher cost. Other data transmission medium are also well known to those skilled in the art.

In the present example, the content server 118 is a "mirror site" that is coupled to a remote content server 122 by, for example, the Internet 124. As is well known to those skilled in the art, a "mirror site" is a site which is updated on a periodic basis, to reflect or "mirror" the contents of another or "master" site, such as content server 122. The purpose of the mirror site 118 is to prevent unnecessary communication delays, especially when transferring large amounts of data, over a relatively slow transmission media such as the Internet 124. For example, one or more content servers can be provided in various cities in Japan while a single content server can be provided in Palo Alto, Calif. A number of content development systems 124 can then be used to load new content on content server 22 which, as explained previously, creates a mirror image of itself at the content server mirror site 118 via the Internet 124 on a periodic basis.

Figure 6:
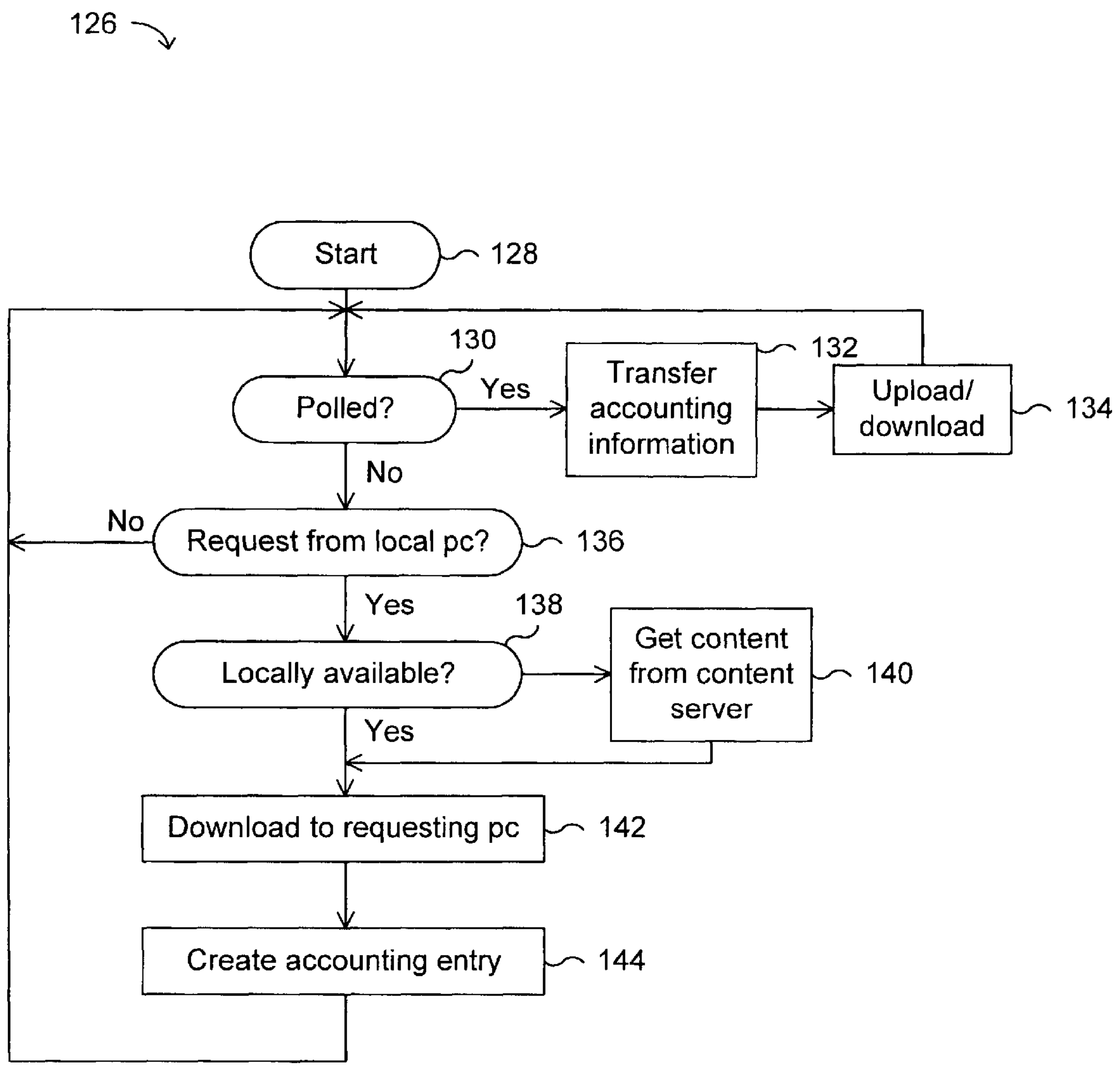
FIG. 6 is a flow diagram illustrating computer implemented acts performed by the local PC server of FIG. 5.

In FIG. 6, a computer implemented process 126 running on the local PC server 116 begins at 128 and, in an operation 130, it determines whether it has been polled by the content server mirror site 118. It should be noted here that the mirror sites 118 are not required, as the local PC server could communicate directly with the content server 122 via the Internet 124. However, for purposes of efficiency, it is often more desirable to access a local mirror site 118.

If the local PC server 116 determines that it has been polled, it connects with the appropriate content server and transfers accounting information in an operation 132. This accounting information can include the number of times a particular karaoke video has been played and what the appropriate charge for the karaoke operator should be. In addition, an operation 134 can be used to upload and download other information, content, software, etc. Process control is then returned to operation 30.

If operation 130 does not detect a polling from a content server, an operation 136 determines whether here is a request from a local PC, i.e. one of the interactive karaoke entertainment systems 10. If not, process control is returned to operation 130. If there is a request from a local PC, an operation 138 determines whether the requested content is locally available. If not, the content is retrieved from the content server in an operation 140. It should be noted that the local PC server 116 can be connected to the content server mirror site 118 either on a continuous basis (such as with a ISDN line) or on an "on demand" basis, such as with dial-up modem access. Next, an operation 142 downloads the requested content to the requesting local PC, and in operation 144 creates an accounting entry at the local PC server 116. This accounting entry, along with other data, is what is transferred to the content server in the operation 132.

Figure 7:
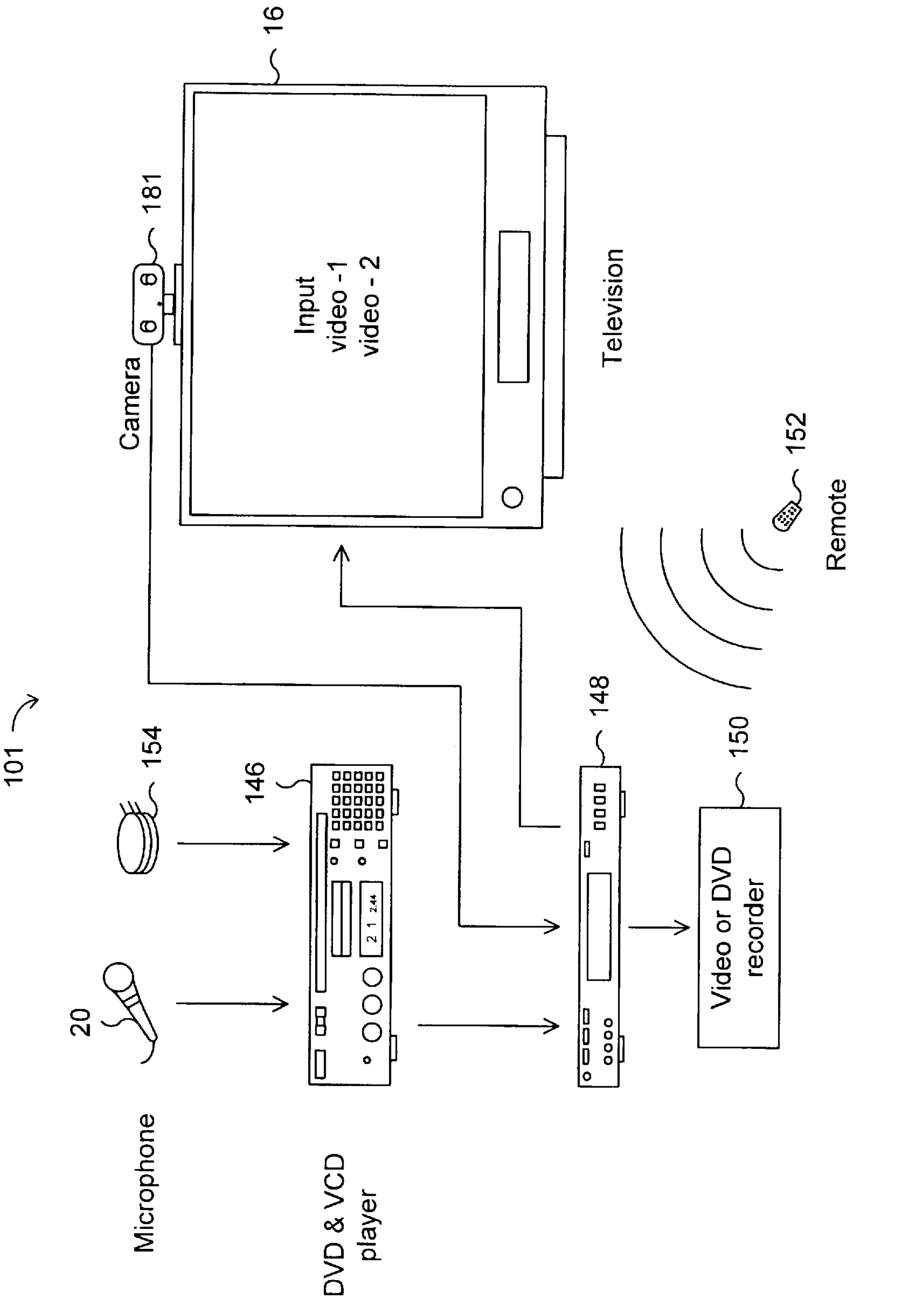
FIG. 7 is a pictorial representation illustrating one implementation of the interactive karaoke entertainment system of the present invention.

In FIG. 7, an alternative interactive karaoke entertainment system 10' includes a DVD and VCD player 146, a karaoke adapter 148 of the present invention, a recorder 150, a binocular camera 18', and a television monitor 16. Preferably, the player 146 and adapter 148 are controlled by a remote control 152. In this embodiment, a microphone 20 is coupled to the player 146, and a number of DVD and/or VCD disks 154 are inserted to the player 146. The output of the player 146 goes into the adapter 148, as does the output of the camera 18'.

In this embodiment of the present invention, the adapter 48 performs the functionality described previously with regards to the PC 14 running the computer implemented process 68 of FIG. 4. However, the advantage of this systems is that a separate, dedicated personal computer 14 is not required, since that functionality has been integrated into the adapter 148. The output of the adapter 148 is input into the television monitor and/or loudspeakers (not shown). In addition, a VCR, recordable CD-ROM or recordable DVD recorder 150 can be used to record the output of the adapter 148.

Figure 8A:
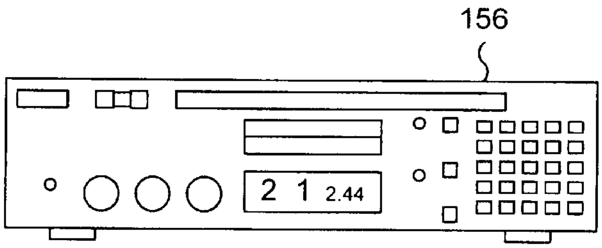
FIGS. 8A and 8B illustrate illustrating another, more integrated, implementation of the interactive karaoke entertainment system of the present invention.
Figure 8B:
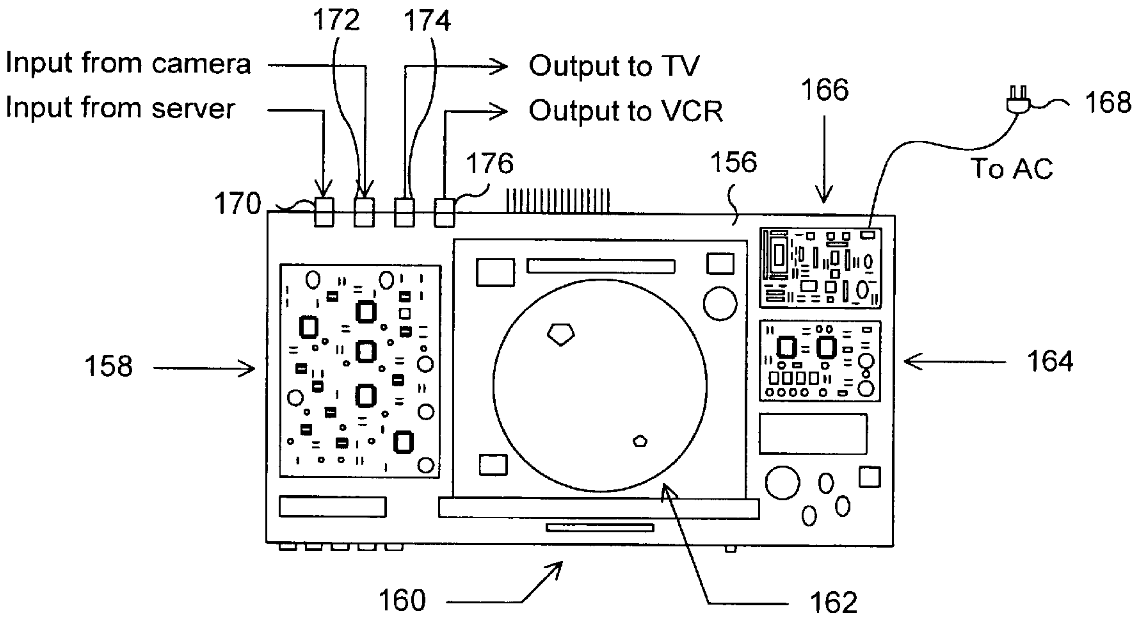

In FIGS. 8A and 8B, yet another alternate embodiment of the present invention integrates the functionality of the player 146 with the adapter 158 of FIG. 7. More particularly, a combination DVD/VCD karaoke player 156 is shown in a front elevational view in FIG. 8A and a top plan view with the top lid removed in FIG. 8B.

With primary reference to FIG. 8B, the combined unit 156 includes a VCD and DVD logic module 158, a disk loader 160, a VCD and DVD drive 162, and a karaoke module 164. A power supply 166 is coupled to a source of AC power by a cord and plug 68. The unit 156 has, as inputs, an input 170 from the server, and an input 172 from the camera. The unit 156 has, as outputs, an output 174 to the television monitor 16 and an output 176 to recorder 150. The advantaged of integrating the karaoke module 164 into a DVD and VCD player includes both size and cost reductions.

Figure 9:
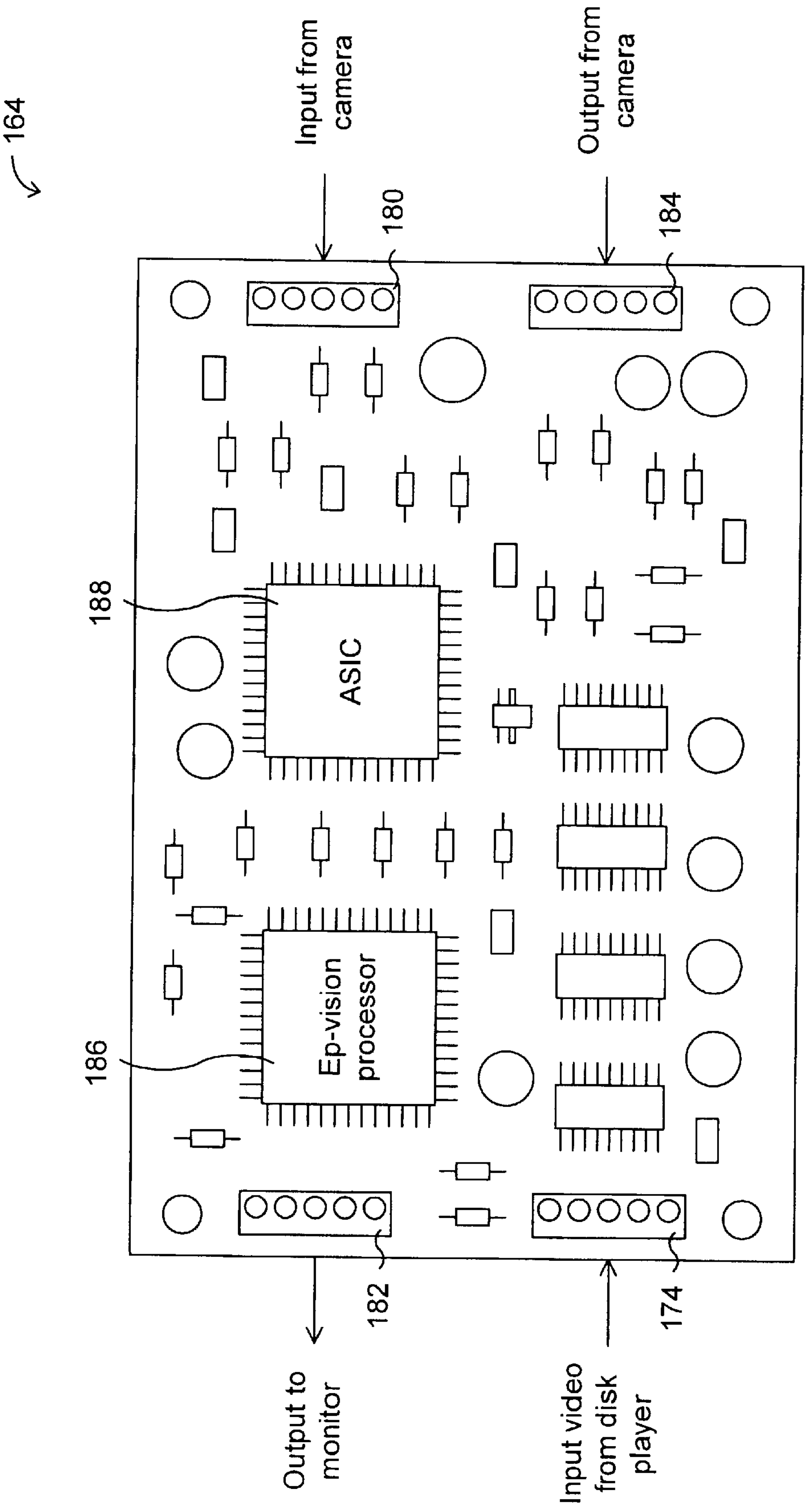
FIG. 9 is a more detailed view of the karaoke module used in the DVD and VCD player of FIGS. 8B.

In FIG. 9, the interactive video karaoke module 164 is shown in a conceptual form. It includes, as inputs, an input 174 for receiving video input from the disk player, and an input 180 for receiving input from the camera 18'. In addition, the module 164 includes an output 182 to the television monitor 16 and an optional output 184 to the camera 18'. It is therefore contemplated that the camera 18' being used with the interactive karaoke entertainment system 10' may be a "smart" camera which can receive programs, data, and commands from the karaoke module 164. The karaoke module 164 includes a vision processor 186 and an ASIC 188 to handle data communications between the karaoke module 164 and the rest of the unit 156.

Figure 10:
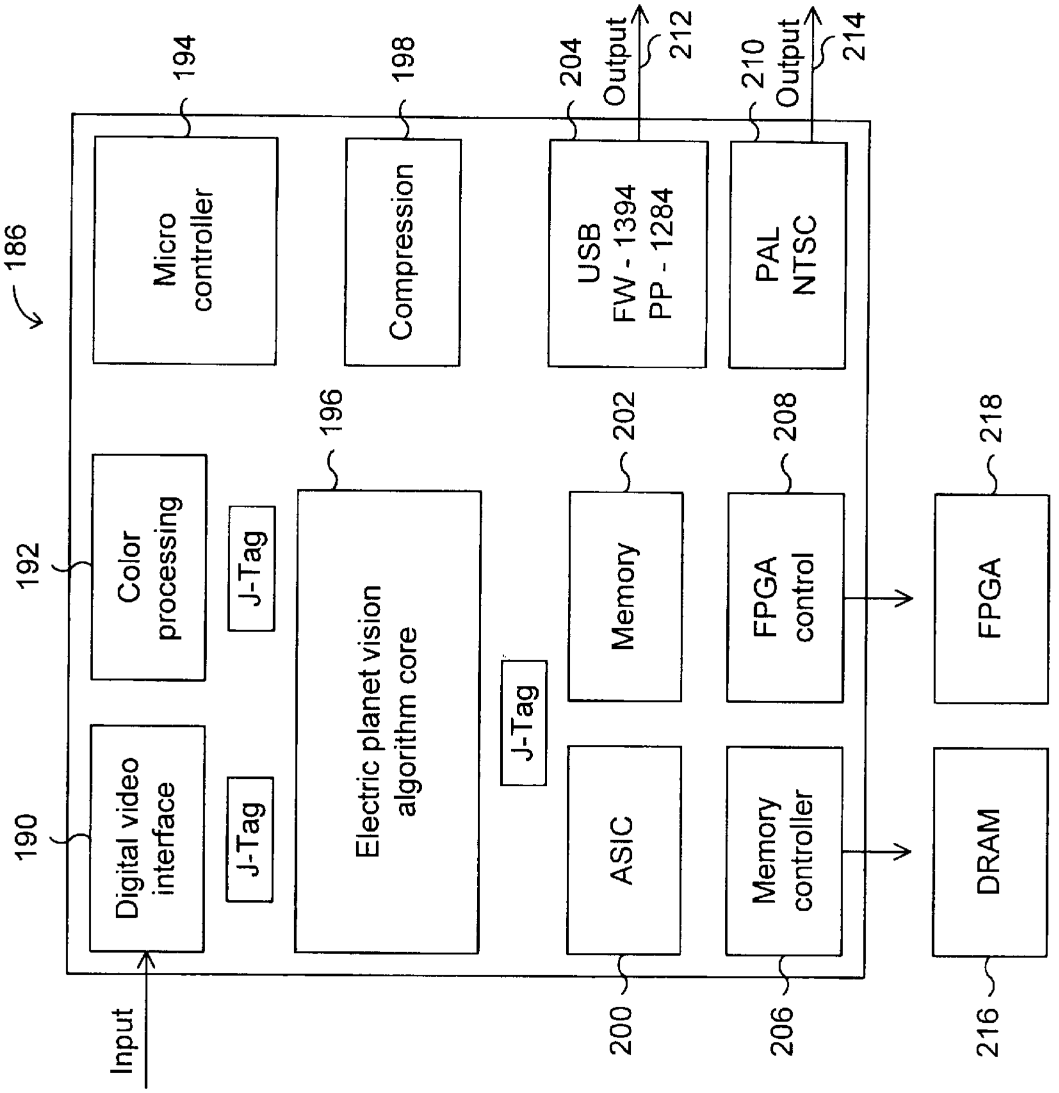
FIG. 10 is a block diagram of the vision processor of the karaoke module illustrated in FIG. 9.
Figure 10A:
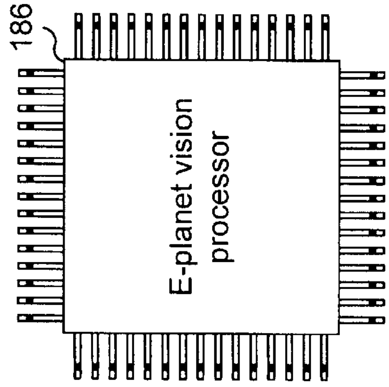
FIGS. 10A and 10B illustrate a preferred integrated circuit package arrangement for the vision processor of FIG. 10.
Figure 10B:
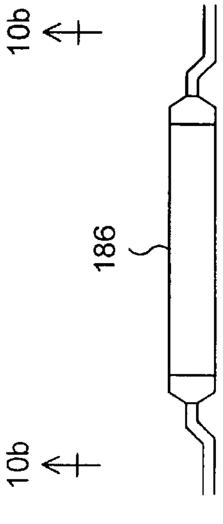

In FIG. 10, a block diagram of the major components of the vision processor 186 is illustrated. More particularly, the vision processor 186 includes a digital video interface 190, the color processing unit 192, a microcontroller 194, a vision algorithm core 196, a compression unit 198, an ASIC 200 to handle various glue logic functions, memory 202, a Universal Serial Bus (USB) module 204, a memory controller 206, a field programmable gate array (FPGA) controller 208, and a PAL/NTSC module 210. J-Tag circuitry can be included to provide boundary scan capabilities. The input signals (at the digital video interface 190) are processed by the vision processor 186 under microcontroller 194 control. A first output 212 is provided by the USB, and a second output, either for European (PAL) or U.S. (NTSC) video formats is provided at an output 214. External DRAM 216 is coupled to the memory controller 206, and an external FTGA 218 is coupled to the FPGA controller 208. A top plan view of a preferred packaging for the vision processor 186 is shown in FIG. 10A, with a side elevational view taken along line 10B—10B is shown in FIG. 10B.

Figure 11:
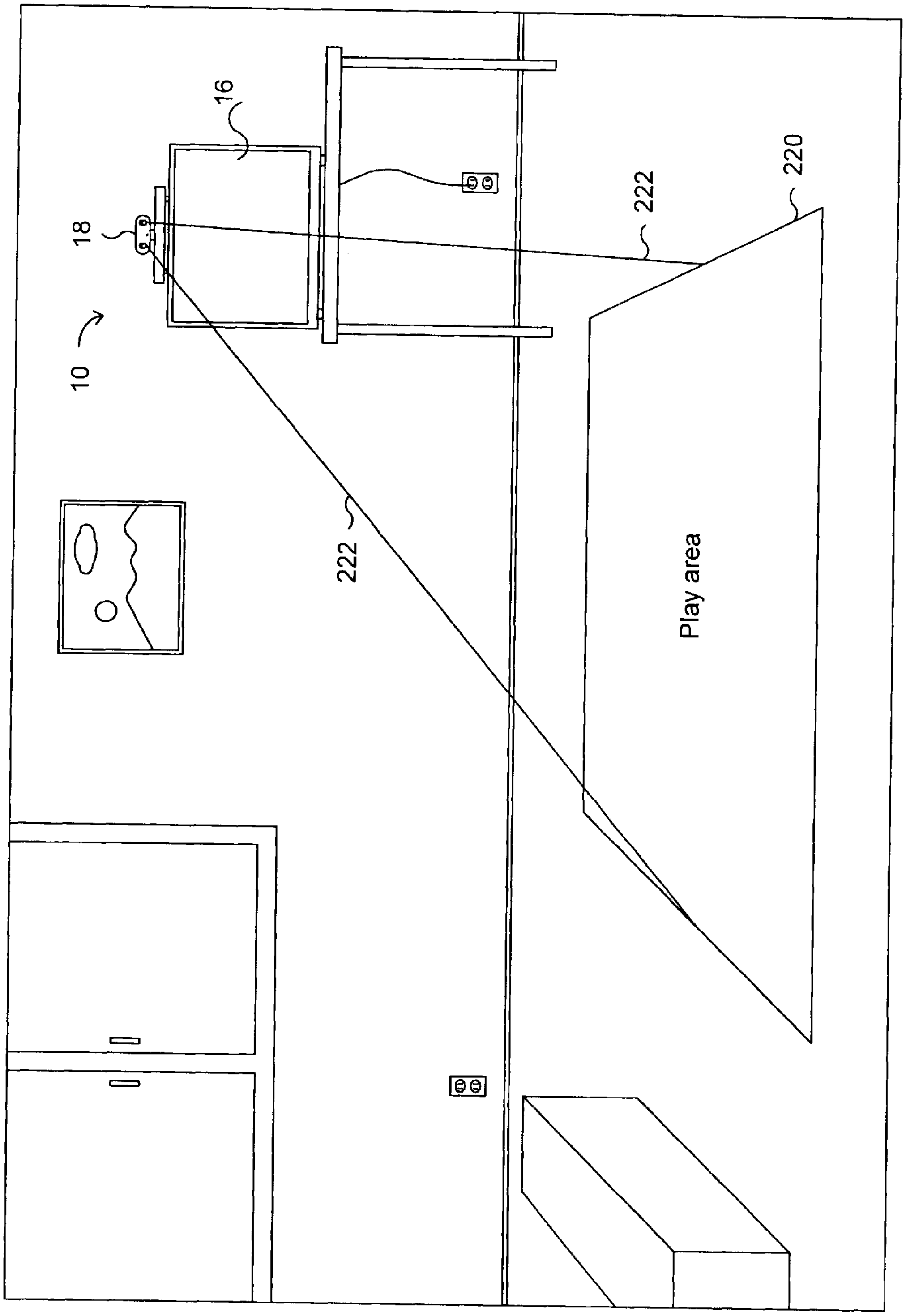
FIG. 11 illustrates a typical set-up of an interactive karaoke entertainment system of the present invention.

In FIG. 11, an exemplary use of an interactive karaoke entertainment system 10 is illustrated. The camera 18 of the unit is aimed toward a play area 220 where the karaoke customers may sing and otherwise perform. It is preferred that the customer stay within the play area 220 so as to remain within the "field of sight" 222 of the camera 18. A wired or wireless microphone 20 can be used by the karaoke customers as they sing, and a remote control can be used to activate the system and to select the karaoke music video they wish to accompany. As the karaoke customers moves about in the play area 220 and make pre-determined gestures and poses, they can interact with the video and other content displayed on the television monitor 16.

Figure 12:
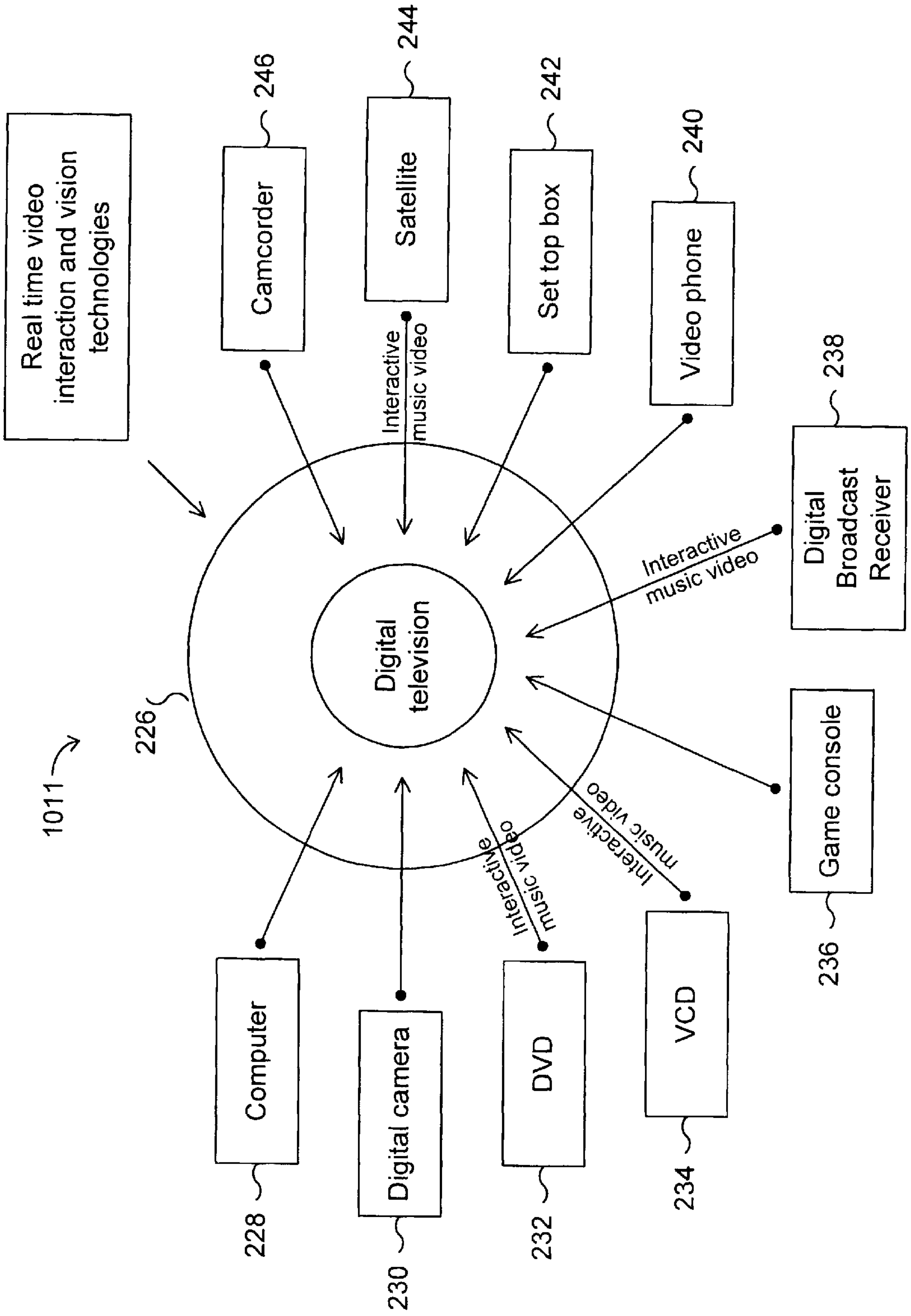
FIG. 12 illustrates an embodiment of the present invention that utilizes a digital television system.

While the present invention has been described primarily with reference to standard television (analog) monitors, an embodiment of the present invention utilizes the new digital television standards. More particularly, in FIG. 12 a digital television 224 is used as the display unit an interactive karaoke entertainment system 10". The real time video interaction and vision technologies 226, as disclosed herein provide an interaction between the digital television and a number of peripheral sources. More particularly, the real time video interaction vision technologies provide an interaction with a computer 228, a digital camera 230, a DVD player 232, a VCD player 234, a game console 236, a digital broadcast receiver 238, a video telephone 240, a "set top" box 242, a satellite receiver 244, or a camcorder 246. It will be appreciated by those skilled in the art, the functionality of the interactive karaoke entertainment systems 10 as described with reference to the analog television monitor are quite transportable to the digital television system as well.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

What is claimed is:

1. A method for providing interactive karaoke entertainment comprising:

receiving a plurality of video frames which include images of at least one karaoke performer;

subtracting background images from said video frames to create extracted images of said at least one karaoke performer;

performing an analysis of at least one of the position and motion of said extracted images to provide a visual performer input;

retrieving accompanying sound from a server; and providing background images with the accompanying sound, at least one of which is affected, by said visual performer input.

2. A method for providing interactive karaoke entertainment as recited in claim 1 wherein said background images and accompanying sound are based upon stored content.

3. A method for providing interactive karaoke entertainment as recited in claim 1 wherein said analysis includes a tracking analysis and a gesture analysis.

4. A method for providing interactive karaoke entertainment as recited in claim 3 further comprising compositing said extracted images with said background images to create composited images.

5. A method for providing interactive karaoke entertainment as recited in claim 4 further comprising recording said composited images and accompanying sound.

6. A computer program product for providing interactive karaoke entertainment, the computer program product being embodied in a computer readable medium and comprising computer instructions for:

receiving a plurality of video frames which include images of at least one karaoke performer;

subtracting background images from said video frames to create extracted images of said at least one karaoke performer;

performing an analysis of at least one of the position and motion of said extracted images to provide a visual performer input;

retrieving accompanying sound from a server; and providing background images with the accompanying sound, at least one of which is affected, by said visual performer input.

7. An interactive karaoke entertainment system comprising:

means for receiving a plurality of video frames which include images of at least one karaoke performer;

means for subtracting background images from said video frames to create extracted images of said at least one karaoke performer;

means for performing an analysis of at least one of the position and motion of said extracted images to provide a visual performer input;

means for providing background images with accompanying sound, at least one of which is affected, by said visual performer input; and means for retrieving the accompanying sound from a server.

8. An interactive karaoke entertainment system as recited in claim 7 further comprising means for storing stored content upon which said background images and accompanying sound are based.

9. An interactive karaoke entertainment system as recited in claim 7 wherein said means for performing an analysis includes means for performing a tracking analysis and means for performing a gesture analysis.

10. An interactive karaoke entertainment system as recited in claim 9 further comprising means for compositing said extracted images with said background images to create composited images.

11. An interactive karaoke entertainment system as recited in claim 10 further comprising means for recording said composited images and accompanying sound.

* * * * *